United States Patent [19]

Robinson et al.

[11] Patent Number: 4,738,944

[45] Date of Patent: Apr. 19, 1988

[54] NI-P-MO CATALYST AND HYDROPROCESSING USE THEREOF

[75] Inventors: Paul R. Robinson, Diamond Bar; Howard D. Simpson, Irvine, both of Calif.

[73] Assignee: Union Oil Company of California, Los Angeles, Calif.

[21] Appl. No.: 938,289

[22] Filed: Dec. 5, 1986

[51] Int. Cl.$^4$ .................. B01J 27/19; C10G 45/04
[52] U.S. Cl. ............................. 502/211; 502/213; 208/254 H; 208/216 PP; 208/251 H
[58] Field of Search ........................ 502/211, 213

[56] References Cited

U.S. PATENT DOCUMENTS

| | | |
|---|---|---|
| 3,897,365 | 7/1975 | Feins et al. ............... 502/211 |
| 4,255,282 | 3/1981 | Simpson .................. 502/211 |
| 4,317,746 | 3/1982 | Richardson ............... 502/211 |
| 4,395,328 | 7/1983 | Hensley, Jr. et al. ....... 502/211 |
| 4,395,329 | 7/1983 | LaPage et al. ............ 502/211 |
| 4,444,905 | 4/1984 | Pessimisis ............... 502/211 |
| 4,446,248 | 5/1984 | Simpson et al. .......... 502/211 |
| 4,513,097 | 4/1985 | Angmorter et al. ........ 502/211 |
| 4,520,128 | 5/1985 | Morales et al. .......... 502/211 |
| 4,600,703 | 7/1986 | Morales et al. .......... 502/213 |

FOREIGN PATENT DOCUMENTS

| | | | |
|---|---|---|---|
| 0067708 | 12/1982 | European Pat. Off. ........ 502/211 |
| 0112667 | 7/1984 | European Pat. Off. ........ 502/211 |
| 0126250 | 11/1984 | European Pat. Off. ........ 502/211 |
| 0069149 | 4/1984 | Japan ..................... 502/211 |
| 1024317 | 3/1966 | United Kingdom ........... 502/211 |

Primary Examiner—Helen M. S. Sneed
Assistant Examiner—Helane Myers
Attorney, Agent, or Firm—Dean Sandford; Gregory F. Wirzbicki; Alan H. Thompson

[57] ABSTRACT

A hydroprocessing catalyst contains nickel, phosphorus and about 19 to about 21.5 weight percent of molybdenum ($MoO_3$) components on a porous refractory oxide. The catalyst has a narrow pore size distribution wherein at least 75 percent of the pore volume is in pores of diameter from about 50 to about 110 angstroms, at least 10 percent of the pore volume in pores of diameter less than 70 angstroms and at least 60 percent of the pore volume in pores of diameter within about 20 angstroms above or below the average pore diameter. The catalyst is employed to hydroprocess a hydrocarbon oil, especially those oils containing sulfur and nitrogen components.

14 Claims, 1 Drawing Sheet

NI-P-MO CATALYST AND HYDROPROCESSING USE THEREOF

BACKGROUND OF THE INVENTION

This invention relates to a hydroprocessing catalyst and its use for hydroprocessing hydrocarbon-containing oils.

In the refining of hydrocarbon oils, it is often desirable to subject the hydrocarbon oil to catalytic hydroprocessing. During hydroprocessing, particulate catalysts are utilized to promote reactions such as desulfurization, denitrogenation, demetallization and/or conversion of asphaltene compounds. This is accomplished by contacting the particulate catalyst with a feedstock, such as a vacuum gas oil residual petroleum oil fraction, under conditions of elevated temperature and pressure and in the presence of hydrogen so that the sulfur components are converted to hydrogen sulfide, nitrogen components to ammonia, asphaltenes to molecules having increased hydrogen to carbon (H/C) ratios and contaminant metal components to components capable of being deposited on the catalyst. Typically, hydroprocessing is employed to reduce the concentration of nitrogen and sulfur in feedstocks so as to produce hydrocarbons which, when eventually combusted, result in reduced air pollutants of the forms $NO_x$ and $SO_x$. Reducing the concentration of nitrogen and metals is also desirable to protect other refining catalysts, such as hydrocracking catalysts, which deactivate in the presence of nitrogen and contaminant metals.

A typical hydroprocessing catalyst contains hydrogenation metals on a porous refractory oxide support. Hydrogenation metals usually include Group VIB and/or Group VIII active metal components supported on amorphous refractory oxide supports such as alumina. Also, phosphorus components have been incorporated in such catalysts. One group of hydroprocessing catalysts which have provided excellent service to petroleum refiners is a nickel-phosphorus-molybdenum-containing catalyst, commonly called a "Ni-P-Mo" catalyst. The porous refractory oxide supports of such catalysts have a wide variety of pore sizes and pore size distributions. Recently, active and stable Ni-P-Mo catalysts having particularly narrow pore size distributions have been useful in hydroprocessing hydrocarbons. For example, U.S. Pat. No. 4,500,424 issued to Simpson et al. discloses a Ni-P-Mo catalyst having a pore size distribution including at least 75 percent of the pore volume in pores of diameter from about 70 to about 130 angstroms, and further containing less than 10 percent of the total pore volume in pores of diameter less than 70 angstroms. During recent years, industrial use has been made of Ni-P-Mo catalysts having high contents of molybdenum, i.e., at least equal to 25 weight percent, calculated as $MoO_3$, and having narrow pore size distributions similar to those disclosed in U.S. Pat. No. 4,500,424, but containing more than 10 percent of the total pore volume in pores of diameter less than 70 angstroms.

Despite the high hydroprocessing activity of the catalysts of the prior art, catalysts of yet higher activities and/or stabilities are still being sought. The higher the activity of the catalyst, the lower the reactor temperature required to obtain a product of given nitrogen, sulfur, asphaltene, or metal content from the feedstock. The lower the reaction temperature, the lower the expense of hydroprocessing a given unit of feedstock due to savings in process heat requirement. Furthermore, hydroprocessing at a lower reaction temperature usually extends the life of the catalyst, i.e., increases catalyst stability, assuming, of course, that all other process parameters are held constant.

Accordingly, it is a major object of the invention to provide an improved hydroprocessing catalyst, and particularly, an improved hydroprocessing catalyst relative to known comparable catalysts.

A further object is to provide a process for hydrodesulfurizing or hydrodenitrogenating a hydrocarbon feedstock containing a relatively low content of organometallic components.

These and other objects and advantages of the invention will become apparent from the following description.

SUMMARY OF THE INVENTION

The invention provides a catalyst containing at least one active nickel and molybdenum hydrogenation metal component and at least one phosphorus component supported on an amorphous porous refractory oxide wherein the catalyst has a narrow pore size distribution including at least 75 percent of the total pore volume in pores of diameter from about 50 to about 110 angstroms and at least 10 percent of the total pore volume in pores of diameter less than 70 angstroms. In one preferred embodiment, the catalyst has at least about 60 percent of the pore volume in pores of diameter within about 20 angstroms above or below an average pore diameter in the range from about 55 to about 90 angstroms provided that between about 16 and about 24 percent of the total pore volume is in pores of diameter less than 70 angstroms.

One preferred catalyst of the invention comprises between 1.0 and 5.0 weight percent each of nickel and phosphorus components, and between 12 and 24 weight percent of molybdenum components supported on gamma alumina or a similarly active alumina. One of the most important discoveries in the invention is that a catalyst containing between about 19 and about 21.5 weight percent of molybdenum components (as $MoO_3$) supported on gamma alumina and related materials having a relatively small average pore diameter (i.e., about 75 to about 85 angstroms) and a narrow pore size distribution (i.e., at least about 70 percent of the pore volume in pores of diameter within about 20 angstroms above or below the average pore diameter and still having at least 10 percent of the pore volume in pores of diameter less than 70 angstroms) exhibits surprisingly greater stability under hydroprocessing conditions than a catalyst prepared with the same support yet containing a higher weight percent of molybdenum components. Accordingly, the catalyst of the invention provides an advantage to the catalyst manufacturer by allowing preparation of a less expensive catalyst containing lower molybdenum contents. Also, the catalyst provides a further advantage to the petroleum refiner by allowing hydroprocessing of hydrocarbons with a catalyst having longer life.

In one embodiment, the catalyst of the invention is contacted with a hydrocarbon oil in the presence of hydrogen under denitrogenation and/or desulfurization conditions to produce a product hydrocarbon oil of reduced nitrogen and/or sulfur content. In another embodiment, a residuum hydrocarbon oil is hydroprocessed including simultaneous demetallation, desulfurization and denitrogenation, by contact with the catalyst under hydroprocessing conditions correlated to convert a portion of the oil fraction boiling above 1000° F. to hydrocarbon products boiling at or below about 1000° F. and having a reduced nitrogen and sulfur content. It is preferred that the catalyst of the invention be employed downstream of a demetallation catalyst having an average pore diameter at least 30 angstroms larger than that of the catalyst of the invention.

BRIEF DESCRIPTION OF THE DRAWING

The invention will be more readily understood by reference to the accompanying drawing.

DETAILED DESCRIPTION OF THE INVENTION

Figure 1:
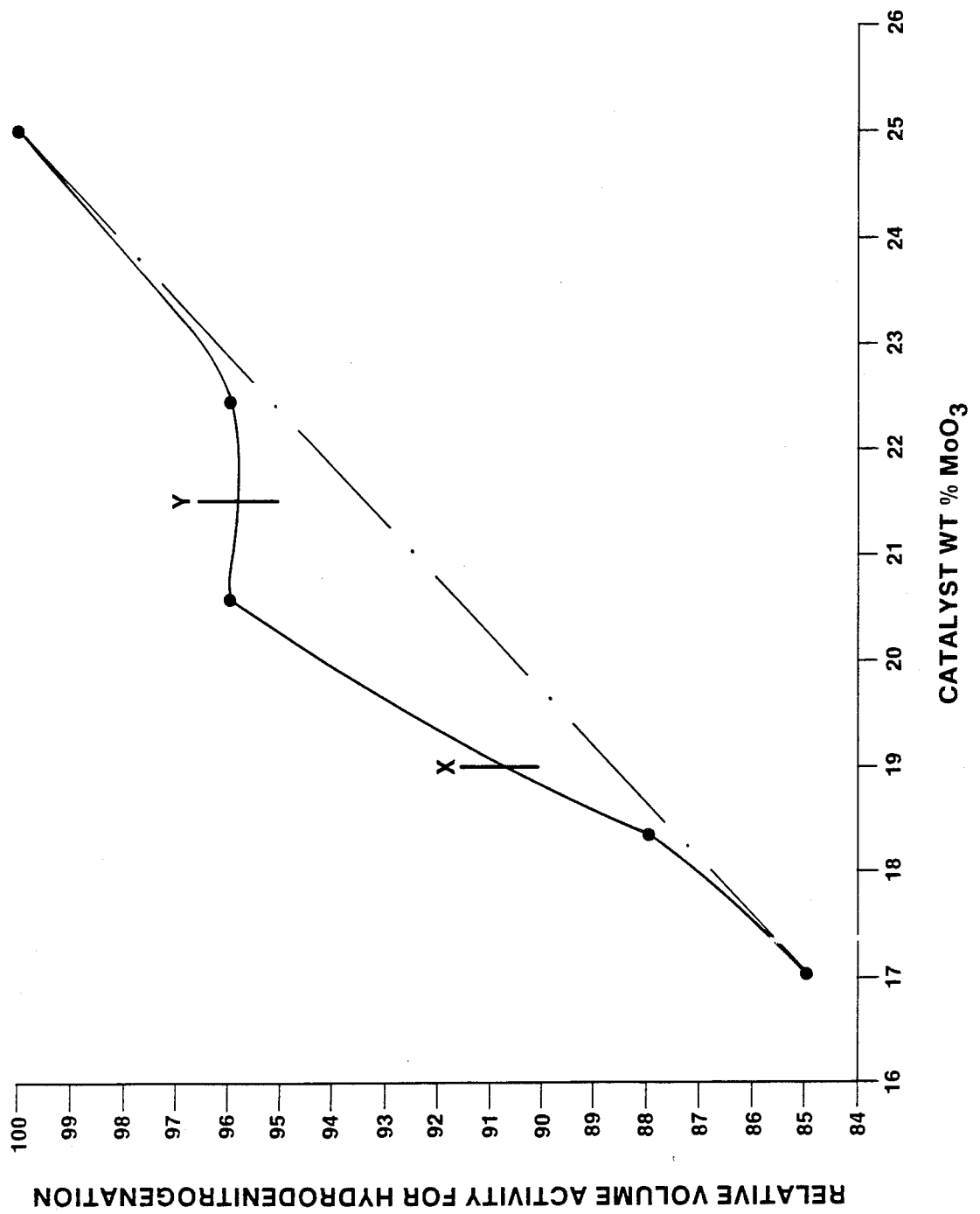
FIG. 1 compares the performances of five catalysts differing from each other by the weight percentages of molybdenum trioxide, the comparisons being based upon the activities of the catalysts for hydrodenitrogenating a vacuum gas oil.

The invention is directed to a catalyst comprising one or more active nickel and molybdenum hydrogenation metals or compounds thereof and at least one phosphorus component on a porous amorphous refractory oxide having a relatively narrow pore size distribution. The catalyst contains about 19 to about 21.5 weight percent of molybdenum components, calculated as $MoO_3$, and has a narrow pore size distribution wherein at least about 75 percent of the total pore volume of the catalyst is in pores of diameter from about 50 to about 110 angstroms, greater than 10 percent of the total pore volume in pores of diameter less than 70 angstroms and at least about 60 percent of the total pore volume is in pores of diameter within about 20 angstroms above or below the average pore diameter of the catalyst, as measured by mercury porosimetry.

In the preparation of the catalyst of the present invention, the pore size distribution of the amorphous support particles may be similar to that of the final catalyst, but such is not necessary or critical. The amorphous refractory oxide support material is typically comprised of such amorphous inorganic refractory oxides as silica, magnesia, silica-magnesia, zirconia, silica-zirconia, titania, silica-titania, alumina, silica-alumina, etc. with supports containing gamma alumina being highly preferred. Preferred support particles having the preferred physical characteristics disclosed herein are commercially available from Nippon-Ketjen Catalyst Division of AKZO-Chemie, and American Cyanamid, Inc. Mixtures of the foregoing oxides are also contemplated, especially when prepared as homogeneously as possible.

The amorphous refractory oxide support material is usually prepared in the form of shaped particulates, with the preferred method being to extrude a precursor of the desired support through a die having openings therein of desired size and shape, after which the extruded matter is broken into extrudates of desired length. The support particles may also be prepared by mulling (or pulverizing) a precalcined amorphous refractory oxide to a particle size less than about 100 microns and extruding the material.

The extruded particles may have any cross-sectional shape, i.e., symmetrical or asymmetrical, but most often have a symmetrical cross-sectional shape, preferably a spherical, cylindrical or polylobal shape. The cross-sectional diameter of the particles may be as small as 40 microns; however, it is usually about 1/40 to about ½ inch, preferably about 1/32 to about 1/12 inch, and most preferably about 1/24 to about 1/15 inch. Among the preferred catalyst configurations are cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other preferred particulates are those having quadralobal cross-sectional shapes, including asymmetrical shapes, and symmetrical shapes such as in FIG. 10 of U.S. Pat. No. 4,028,227. Other particulates are available from Davison Chemical Company, a division of W. R. Grace & Company, having ring and minilith shapes, as disclosed in U.S. Pat. No. 4,510,261.

Typical characteristics of the amorphous refractory oxide supports utilized herein are a total pore volume, average pore diameter and surface area large enough to provide substantial space and area to deposit the active metal components. The total pore volume of the support, as measured by conventional mercury porosimeter methods, is usually about 0.2 to about 2.0 cc/gram, preferably about 0.25 to about 1.0 cc/gram, and most preferably about 0.3 to about 0.9 cc/gram. Ordinarily, the amount of pore volume of the support in pores of diameter greater than 100 angstroms is less than about 0.1 cc/gram, preferably less than 0.08 cc/gram, and most preferably less than about 0.05 cc/gram. Surface area (as measured by the B.E.T. method) is typically above about 100 $m^2$/gram, e.g., above about 200 $m^2$/gram, preferably at least 250 $m^2$/gram, and most preferably about 300 $m^2$/gram to about 400 $m^2$/gram. Physical characteristics of an amorphous refractory oxide support utilized in preparation of catalyst employed in the process of the invention is summarized in Table A as follows:

TABLE A

| Pore Diameter Angstroms | Support % Pore Volume |
|---|---|
| <40 | 0.9 |
| 40–50 | 1.8 |
| 50–60 | 10.0 |
| 60–70 | 36.4 |
| 70–80 | 34.0 |
| 80–90 | 7.8 |
| 90–100 | 1.0 |
| 100–110 | 1.8 |
| >110 | 6.3 |
| PORE VOLUME cc/gram (Merc. Poros.) | 0.55 |
| Surface Area $m^2$/gram (B.E.T.) | 300 |

To prepare the catalyst, the support material is compounded, as by a single impregnation or multiple impregnations of a calcined amorphous refractory oxide support particles, with one or more precursors of at least one catalytically active hydrogenation metal component. The impregnation may be accomplished by any method known in the art, as for example, by spray impregnation wherein a solution containing the metal precursors in dissolved form is sprayed onto the support particles. Another method is the multi-dip procedure wherein the support material is repeatedly contacted with the impregnating solution with or without intermittent drying. Yet other methods involve soaking the support in a large volume of the impregnation solution or circulating the support therein, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination at elevated temperatures, as for example, between 750° F. and 1400° F., converts the metals to their respective oxide forms. In some cases, calcinations may follow each impregnation of individual active metals. Such multiple impregnation-calcination procedures, however, may be avoided in alternative embodiments of the invention, as for example, by comulling all the active metals with the support materials rather than impregnating the metals thereon. In comulling, precursors of the support materials usually in a hydrated or gel form, are admixed with precursors of the active metal components, either in solid form or in solution, to produce a paste suitable for shaping by known methods, e.g., pelleting, extrusion, etc. A subsequent calcination yields a catalyst containing the active metals in their respective oxide forms.

When the catalyst is prepared by the foregoing or equivalent methods, at least one active nickel and molybdenum metal component having hydrogenation activity is introduced into the catalyst. The catalyst contains up to about 10, usually from 1 to 8 percent, and preferably from 2 to 6 percent by weight of nickel metal components, calculated as the monoxide, and about 16 to about 23 and preferably from 19 to 21.5 percent by weight of molybdenum metal components, calculated as molybdenum trioxide ($MoO_3$). Molybdenum generally is solubilized with phosphoric acid during the preparation of the catalyst; however, ammonium hydroxide, citric acid, and the like, may also be utilized to solubilize the molybdenum. Accordingly, the catalyst will further contain a phosphorus component, which phosphorus component may provide acid properties to the catalyst or act as a catalytic promoter. Typically the catalyst contains about 1 to about 8, and preferably about 2 to about 6 weight percent of phosphorus components, calculated as P.

The physical characteristics of the finished catalyst will usually vary from those of the support particles by less than about 25 percent. Ordinarily, the catalyst is prepared so as to have a narrow pore size distribution wherein at least about 75 percent, preferably at least about 80 percent, and most preferably at least about 85 percent of the total pore volume is in pores of diameter from about 50 to about 110 angstroms. Ordinarily the catalyst has less than about 10 percent of the total pore volume in pores of diameter below about 50 angstroms and preferably less than about 0.05 cc/gram. Also, the catalyst has less than about 10 percent of the pore volume in pores of diameter greater than about 110 angstroms, preferably less than about 0.05 cc/gram.

Another porosity feature of the catalyst is the narrow pore size distribution of the pores of diameter slightly above or below the average pore diameter. The average pore diameter of the catalyst usually lies in the range from about 65 to about 90 angstroms, preferably about 70 to about 85 angstroms. Ordinarily, at least about 40 percent of the total pore volume is in pores of diameter between the average pore diameter and less than about 30 angstroms and most preferably less than about 25 angstroms above the average pore diameter. With respect to small pores, at least about 40 percent of the total pore volume is in pores of diameter between the average pore diameter and less than about 30, and preferably less than about 25 angstroms below the average pore diameter.

Other physical properties of the final catalyst typically include a total pore volume of about 0.20 to about 1.0 cc/gram, and preferably about 0.20 to about 0.60 cc/gram and most preferably about 0.25 to about 0.5 cc/gram and a surface area greater than about 100 $m^2$/gram, preferably greater than about 150 $m^2$/gram and most preferably between about 175 and 350 $m_2$/gram with both properties determined by the conventional methods previously disclosed herein. Further, the catalyst generally has less than about 0.1 cc/gram, preferably less than 0.08 cc/gram and most preferably less than 0.06 cc/gram in pores of diameter greater than about 100 angstroms.

A highly preferred catalyst of the invention contains about 1 to about 6 weight percent of nickel component, calculated as NiO, from about 19 to about 21.5 weight percent of molybdenum components, calculated as $MoO_3$, and about 1 to about 6 weight percent of phosphorus components, calculated as P, on a support containing gamma alumina. This catalyst has a surface area from about 150 $m^2$/gram to about 300 $m^2$/gram, an average pore diameter from about 75 to about 85 angstroms, and a pore size distribution wherein at least about 70 percent of the pore volume is in pores of diameter in the range from about 20 angstroms above to about 20 angstroms below the average pore diameter and less than about 0.06 cc/gram of the total pore volume in pores of diameter greater than 100 angstroms. It is highly preferred that the catalyst contain between about 16 and about 24 percent of its total pore volume in pores of diameter less than 70 angstroms.

Catalysts are activated in accordance with methods suited to hydroprocess a hydrocarbon oil. Most of the catalysts used in the hydroprocess of the invention are more active, sometimes even far more active, in a sulfided form than in the oxide form in which they are generally prepared. Accordingly, the catalyst used herein may be sulfided prior to use by any known method (in which case the procedure is termed "presulfiding"), for example, by passing a sulfiding agent over the catalyst prepared in the calcined form. Temperatures between 300° and 700° F. and gaseous space velocities between about 140 and 500 v/v/hr are generally employed, and this treatment is usually continued for at least about two hours. A mixture of hydrogen and one or more components selected from the group consisting of sulfur vapor and sulfur compounds (e.g., lower molecular weight thiols, organic sulfides, and especially $H_2S$) is suitable for presulfiding. Generally speaking, the relative proportion of sulfiding compounds in the presulfiding mixture is not critical, with any proportion of sulfur ranging between 0.01 and 15 percent by volume, calculated as S, being adequate. Also, liquid sulfiding agents, such as dimethyl disulfide and the like, may be used for presulfiding.

If the catalyst is to be used in a sulfided form, it is preferred that a presulfiding procedure be employed. However, since hydroprocessing can be employed to upgrade sulfur-containing hydrocarbons (i.e., hydrodesulfurization), one may, as an alternative, accomplish the sulfiding in situ with sulfur-containing hydrocarbon oils, particularly those containing about 1.0 weight percent or more of sulfur, under hydroprocessing conditions.

The catalyst may be employed as either a fixed, ebullating, slurried or fluidized bed (but most usually a fixed bed) of particulates in a suitable reactor vessel wherein the hydrocarbon oil to be treated is introduced and subjected to hydroprocessing conditions including an elevated total pressure, temperature, and hydrogen partial pressure. Under such conditions, the hydrocarbon oil and catalyst are subjected to a hydrogen partial pressure usually in the range from about 100 to about 4,000 p.s.i.g. at a space velocity usually in the range from about 0.05 to about 20 LHSV so as to effect the desired degree of hydroprocessing, as for example, desulfurization and/or denitrogenation.

Contemplated for treatment by the process of the invention are relatively high boiling hydrocarbon-containing oils including crude petroleum oils and synthetic crudes. Among the typical oils contemplated are top crudes, vacuum and atmospheric residual fractions, light and heavy atmospheric and vacuum distillate oils, deasphalted oils, shale oils, and oils from bituminous sands, coal compositions and the like. For use herein, typical hydrocarbon oils, or mixtures thereof, may contain at least about 10 volume percent of components normally boiling above about 1000° F. and in some cases, at least 20 volume percent.

Generally, a substantial proportion (i.e., at least about 90 volume percent) of hydrocarbon feeds such as gas oils and the like boil at a temperature less than about 1100° F., preferably less than about 1050° F., and usually boil entirely within the range of about 100° F. to about 1100° F., and most frequently in the range from about 400° F. to about 1100° F.

Although virtually any high boiling hydrocarbon feedstock may be treated by hydroprocessing with the catalyst of the invention, the process is particularly suited to treating (1) gas oils, preferably light and heavy vacuum gas oils and waxy shale oils, and (2) heavy residual fractions, especially the treated atmospheric and vacuum residuum oils containing less than about 25 ppmw, preferably less than 5 ppmw and most preferably less than 3 ppmw of contaminant metals (vanadium, nickel, and the like). Sulfur is usually present in such oils in a proportion exceeding 0.1 weight percent and often exceeding 1.0 weight percent; however, a particular preferred proportion is about 0.1 to about 0.5 weight percent. The feedstock contains undesirable proportions of nitrogen, usually in a concentration greater than about 2 ppmw and often between about 2 ppmw and 500 ppmw. Ordinarily the feedstock contains less than 200 ppmw of nickel and vanadium contaminant metals, calculated as Ni plus V, with preferred feedstocks containing less than 20 ppmw and most preferably less than 5 ppmw of said materials. The feedstock may contain waxy components, e.g., n-paraffins and slightly-branched paraffins, and thus have a high pour point, e.g., at least about 30° F.

In the hydroprocessing of a hydrocarbon oil, the catalyst is usually maintained in a hydroprocessing reactor as a fixed bed with the feedstock passing downwardly once therethrough. In some instances, one or more additional reactors may be added to the single reactor, either in series or parallel. If the feedstock is unusually high in organometallic compounds, it may be pretreated, integrally or separately, using a hydrodemetallation catalyst and particularly, a hydrodemetallation catalyst having a substantial amount of pore volume in pores of diameter greater than the average pore volume of the catalyst of the invention.

Typical hydroprocessing conditions that are suitable for hydrodenitrogenation, hydrodesulfurization, or that yield more than about 10 volume percent conversion of the oil fraction boiling above 1000° F. to liquid products boiling at or below 1000° F. are shown in the following Table I:

TABLE I

| Operating Conditions | Suitable Range | Preferred Range |
| --- | --- | --- |
| Temperature, °F. | 500–900 | 600–850 |
| Hydrogen Pressure, p.s.i.g. | 200–4,000 | 1,500–2,500 |
| Space Velocity, LHSV | 0.05–3.0 | 0.1–1.5 |
| Hydrogen Recycle Rate, scf/bbl | 500–15,000 | 1,000–10,000 |

Generally, the hydrogen partial pressure maintained during hydroprocessing is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

The hydroprocess of the invention may include either serial or simultaneous desulfurization and denitrogenation of a feedstock. Simultaneous desulfurization, denitrogenation and heavy component (1000° F. plus components) conversion, as used herein, involves contacting a hydrocarbon oil feedstock with the particulate catalyst disclosed herein under conditions effecting (1) a lower sulfur and nitrogen content in the effluent and/or (2) a higher percentage of liquid products boiling at or below 1000° F. in the effluent as compared to the feedstock. Serial desulfurization and denitrogenation of a feedstock by contact with the catalyst of the invention involves removing sulfur and nitrogen from the feedstock either prior to or after contact of the feedstock with a catalyst effective for removing a substantial proportion of contaminant metals from the feed.

A preferred embodiment utilizing the catalyst of the invention comprises a combined hydrodemetallation, hydrodesulfurization and hydrodenitrogenation reaction zone wherein the catalyst of the invention is located in a downstream portion of a fixed bed relative to an upstream catalyst bed portion containing a demetallation catalyst having an average pore diameter of at least 30 angstroms greater than that of the catalyst of the invention. In contrast to utilizing a comparable narrow pore sized catalyst containing a higher weight percent of molybdenum components in the downstream location of the catalyst bed, the catalyst of the invention exhibits unexpectedly better stability and provides a surprisingly more stable process for removing nitrogen, sulfur and conversion of 1000° F. plus components to 1000° F. minus components in the oil.

The invention is further illustrated by the following examples which are illustrative of specific modes of practicing the invention and are not intended as limiting the scope of the invention defined by the appended claims.

EXAMPLE I

Catalysts A, B, C, D and E are prepared with the same support material. Catalyst C is prepared by extruding a hydrated alumina-containing material through a die. The extruded matter, having a cross-sectional shape of a three leaf clover, is dried, broken into particulates and calcined at about 1200° F. Support particulates, having a nominal 1/20 inch cross-sectional width (measured by maximum distance across two such clover leaves) and having the pore size distribution shown above in Table A, are then impregnated with a heated solution in which nickel oxide and molybdenum trioxide have been added to phosphoric acid so as to incorporate into the catalyst, after drying and calcination, about 4 weight percent nickel components, calculated as NiO, about 20.6 weight percent molybdenum components, calculated as $MoO_3$, and about 3 weight percent of phosphorus components, calculated as P. The resultant catalyst has a surface area of about 200 $m^2$/gram.

The other catalysts, Catalyst A, B, D and E are prepared in the same manner as Catalyst C. Each has essentially the same nominal weight percentages of nickel and phosphorus components as Catalyst C; however a different amount of molybdenum components is utilized. The weight percentages of molybdenum in Catalysts A through E are shown below in Table IV. Catalyst E, containing 25.0 weight percent of molybdenum components is a commercial hydrodenitrogenation catalyst. Also, the porosity characteristics of the Catalysts A through E are shown below in Table II.

TABLE II

| Pore Diameter Angstroms | % pore volume | | | | |
|---|---|---|---|---|---|
| | A | B | C | D | E |
| <40 | 0.7 | 1.3 | 1.0 | 1.2 | 0.6 |
| 40-50 | 1.1 | 2.5 | 2.1 | 1.1 | 1.8 |
| 50-60 | 6.0 | 5.1 | 6.1 | 4.5 | 3.5 |
| 60-70 | 15.6 | 16.5 | 11.8 | 11.3 | 9.8 |
| 70-80 | 37.1 | 31.7 | 31.6 | 25.4 | 20.6 |
| 80-90 | 25.1 | 28.0 | 31.6 | 35.2 | 30.3 |
| 90-100 | 4.8 | 6.3 | 5.3 | 11.3 | 18.0 |
| 100-110 | 1.2 | 1.3 | 1.8 | 2.0 | 7.4 |
| >110 | 8.4 | 7.3 | 8.7 | 8.0 | 8.0 |
| PORE VOLUME cc/gram (Merc. Poros.) | 0.418 | 0.394 | 0.38 | 0.355 | 0.34 |

All catalysts are individually tested for their activity for hydrodenitrogenating the hydrocarbon feedstock identified in the following Table III.

TABLE III

| Feedstock Properties | |
|---|---|
| Feed Description | Vacuum Gas Oil |
| Gravity, °API | 23.2 |
| Sulfur, wt. % | 1.8 |
| Total Nitrogen, wt. % | 0.312 |
| Basic Nitrogen, wt. % | 0.129 |
| Pour Point, °C. | −18 |
| ASTM D-1160, Vol. % | Distillation, °F. |
| IBP/5 | 185/520 |
| 10/20 | 542/577 |
| 30/40 | 605/633 |
| 50/60 | 667/691 |
| 70/80 | 719/742 |
| 90/95 | 771/796 |
| End Point | 817 |

The test is conducted by contacting the catalysts in separate runs with the feedstock identified in Table III under denitrogenation conditions. However, at the outset of each run, the respective catalysts are presulfided by contact for about 16 to 20 hours with a gas consisting of 90 volume percent $H_2$ and 10 volume percent $H_2S$ flowing at 4.4 SCFM (one atmosphere pressure). The temperature during the presulfiding is initially at room temperature, is increased gradually until 700° F. is reached, and then lowered to 555° F., at which time the catalyst is contacted with the feedstock.

A portion of the feedstock is passed downwardly through a reactor vessel and contacted in separate runs with Catalysts A through D and the commercial hydrodenitrogenation catalyst, Catalyst E, in a single-stage, single-pass system with once-through hydrogen. The operating conditions during each run are summarized as follows: 1,400 p.s.i.g. total pressure, 2.0 LHSV, a hydrogen rate of 6,000 SCF/bbl, and an initial temperature of 720° F.

Giving Catalyst E employed at 60 hours in the reference hydroprocess an arbitrary activity of 100, relative activities of Catalyst C of the invention and Catalysts A, B, and D to Catalyst E are determined by calculation and tabulated in comparison to Catalyst E in Table IV. These determinations are based on a comparison of the reaction rates for denitrogenation obtained from the data of the experiment according to the following standard equation which assumes first order kinetics for denitrogenation:

$$\text{Relative Volume Denitrogenation Activity} = \frac{\ln [C_f/C_p]}{\ln [C_{fr}/C_{pr}]} \times 100$$

where $C_{fr}$ and $C_{pr}$ are the respective concentrations of nitrogen in the feed and product obtained with the catalyst employed in the reference process and $C_f$ and $C_p$ are the respective concentrations of nitrogen in the feed and product obtained with a catalyst being compared to the reference.

The relative volume activity (RVA) for total nitrogen conversion obtained for each catalyst is set forth in Table IV and illustrated in FIG. 1. FIG. 1 illustrates the unexpected deviation of the denitrogenation activity of Catalyst C from the expected linear reference line (LR) that extends through Catalyst A's 17.1 weight percent of $MoO_3$ and Catalyst E's 25 weight percent of $MoO_3$.

TABLE IV

| Catalyst | wt. %, $MoO_3$ | RVA for total nitrogen, $N_{(t)}$ |
|---|---|---|
| A | 17.1 | 85 |
| B | 18.3 | 88 |
| C | 20.6 | 96 |
| D | 22.4 | 96 |
| E | 25.0 | 100 |

The data in Table IV and FIG. 1 indicate that Catalyst C of the invention is nearly as active for denitrogenating a typical hydrocarbon feedstock as Catalysts D and E containing from 1.8 to 4.4 greater weight percentages of molybdenum components, calculated as $MoO_3$. The data obtained evidence the superiority of Catalyst C over that of the other catalysts due to the unexpected activity of a catalyst, Catalyst C (containing 20.6 wt. % of $MoO_3$), representative of catalysts containing molybdenum in the range from about 19 to about 21.5 weight percent, calculated as $MoO_3$. It is clear from FIG. 1 that the 19–21.5 range of $MoO_3$ wt. percent as demarked by X and Y, respectively, is a significant deviation from the expected denitrogenation activity.

EXAMPLE II

In two separate runs for hydroprocessing a residuum hydrocarbon feedstock, Catalysts C and E of Example I are compared for stability.

In each run, the upstream portion (i.e., 60 vol. percent) of a fixed bed hydroconversion reactor is loaded with a demetallation catalyst containing about 5 weight percent of components, calculated as $MoO_3$, and about 1 weight percent of nickel components, calculated as NiO, supported on a refractory oxide and has an average pore diameter of 140 angstroms. The downstream portion (i.e., 40 vol. percent) of the catalyst bed is loaded with Catalyst C for run no. 1 and Catalyst E for run no. 2.

Catalysts in run nos. 1 and 2 are each presulfided in the same manner as in Example I and the runs are conducted as follows: the presulfided catalysts are charged to a reactor, aged for 5 days at 710° F. with a Kuwait atmospheric residuum feedstock having the characteristics shown in Table V and utilized at 775° F. in the presence of added hydrogen to demetallize, desulfurize, denitrogenate and hydroconvert a Sinopec atmospheric residuum feedstock having the characteristics shown in Table V below under the conditions including a 2,000 p.s.i.g. total pressure, a hydrogen rate of 5,000 SCF/bbl, and an overall liquid hourly space velocity (LHSV) of 0.35 (including 0.877 for the demetallization catalyst and 0.581 for Catalysts C or E).

TABLE V

| | Feedstock Properties | |
|---|---|---|
| Feed Description | Sinopec Atmos. Resid | Kuwait Atmos. Resid |
| Nickel, ppmw | 17 | 13 |
| Vanadium, ppmw | 1.4 | 48 |
| Sulfur, wt. % | 2.18 | 3.83 |
| Nitrogen, wt. % | 0.60 | 0.213 |
| Basic Nitrogen, wt. % | 0.208 | 0.050 |
| Asphaltenes, wt. % | 11.8 | 7.0 |
| Conradson Carbon Residue, wt. % | 9.2 | 9.4 |
| Gravity, API @ 60° F. | 14.5 | 16.8 |
| ASTM D-1160 Distillation, °F. | | |
| IBP/5 | 596/715 | 487/610 |
| 10/20 | 783/838 | 664/739 |
| 30/40 | 891/954 | 805/868 |
| 50/60 | 1038/— | 937/1028 |
| Max | 1081 | 1108 |
| % Rec. | 58.0 | 73.0 |

Run nos. 1 and 2 are conducted for 28 and 18 days, respectively. The temperature increase requirement (TIR) for each run is determined from calculated temperatures required for the subject conversions, as adjusted from actual operating reactor temperatures. (As used herein, TIR may be determined by dividing the difference between two temperatures required to give a specific product on two given days in a run by run length interval between these days.)

The calculated TIR values for demetallization (nickel plus vanadium conversion) desulfurization, denitrogenation and 1000°+ F. conversion of the Sinopec residuum feedstock for run nos. 1 and 2 are summarized in Table VI as follows:

TABLE VI

| | TIR in °F./day | |
|---|---|---|
| | Run No. 1 (Catalyst C) | Run No. 2 (Catalyst E) |
| Demetallization | 1.1 | 1.4 |
| Desulfurization | 0.9 | 3.2 |
| Denitrogenation | 0.2 | 3.7 |
| 1000+ F. Conversion | ~0.0 | 0.5 |

The data summarized in Table VI indicate that the stability of Catalyst C of the invention is surprisingly better for the indicated conversions than Catalyst E containing a greater amount of molybdenum components. Most particularly the desulfurization and denitrogenation stability for Catalyst C is at least 3 and 18 times better, respectively, than the stability of Catalyst E in the hydroconversion process. (It will be appreciated that, in this specification, the term "stability" is synonymous with the deactivation resistance of the catalyst, and "TIR" is thus a measure of the deactivation resistance of the catalyst.)

While particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A hydroprocessing catalyst comprising at least one nickel component, about 19 to about 21.5 weight percent of molybdenum components, calculated as $MoO_3$, and at least one phosphorus component on a support comprising an amorphous refractory oxide, said catalyst having at least 75 percent of its total pore volume in pores of diameter from about 50 to about 110 angstroms and at least 10 percent of the total pore volume in pores of diameter less than 70 angstroms.

2. A hydroprocessing catalyst comprising about 2 to 6 weight percent of one or more nickel components, calculated as NiO, from 19 to 21.5 weight percent of one or more molybdenum components, calculated as $MoO_3$, and from about 2 to about 6 weight percent of phosphorus components, calculated as P, on a support consisting essentially of an amorphous porous refractory oxide, said catalyst having an average pore diameter between about 70 and 85 angstroms, having at least 85 percent of the total pore volume in pores of diameter from 50 to 110 angstroms, having less than 10 percent of total pore volume in pores of diameter below 50 angstroms, having less than about 10 percent of the total pore volume in pores above 110 angstroms, having at least 40 percent of the total pore volume in pores within about 25 angstroms of the average pore diameter, having a total pore volume between about 0.25 and 0.5 cc/gram, having a surface area between about 150 and 350 m²/gram, and having less than 0.06 cc/gram in pores of diameter greater than 100 angstroms.

3. A hydroprocessing catalyst as defined in claim 2 wherein said catalyst has a surface area between about 175 m²/gram and 300 m²/gram, at least 70 percent of the total pore volume in pores of diameter within about 20 angstroms of the average pore diameter, and at least 10 percent of the total pore volume is in pores of diameter less than 70 angstroms.

4. A hydroprocessing catalyst as defined in claim 3 wherein about 16 to 24 percent of the total pore volume is in pores of diameter less than 70 angstroms.

5. The catalyst defined in claim 1 wherein said nickel component comprises about 1 to about 6 weight percent, calculated as NiO, and said phosphorus component comprises about 1 to about 6 weight percent, calculated as P.

6. The catalyst defined in claim 1 further comprising at least about 70 percent of said total pore volume in pores of diameter within about 20 angstroms above or below an average pore diameter in the range from about 70 to about 85 angstroms.

7. The catalyst defined in claim 1 having less than about 10 percent of said total pore volume in pores of diameter above about 110 angstroms.

8. The catalyst defined in claim 1 having less than about 0.05 cc/gram of said total pore volume in pores of diameter greater than about 110 angstroms.

9. The catalyst defined in claim 1 wherein said total pore volume is in the range from about 0.20 to about 0.60 cc/gram and the surface area is greater than about 150 m$^2$/gram.

10. The catalyst defined in claim 1 wherein less than 0.08 cc/gram of said total pore volume is in pores of diameter greater than 100 angstroms.

11. The catalyst defined in claim 1 wherein about 16 to about 24 percent of said total pore volume is in pores of diameter less than 70 angstroms.

12. A hydroprocessing catalyst comprising about 1 to about 8 weight percent of nickel components, calculated as NiO, about 19 to about 21.5 weight percent of molybdenum components, calculated as MoO$_3$, and about 1 to 8 weight percent of phosphorus components, calculated as P, on a support comprising gamma alumina, said catalyst having an average pore diameter from about 70 to about 85 angstroms, having at least about 75 percent of the total pore volume in pores of diameter from about 50 to about 110 angstroms, having at least 10 percent of the total pore volume in pores of diameter less than 70 angstroms, having less than about 10 percent of the total pore volume in pores of diameter greater than 110 angstroms, and having at least 60 percent of the total pore volume in pores of diameter within about 20 angstroms above or below the average pore diameter.

13. The catalyst defined in claim 12 wherein said catalyst has a surface area between 175 m$^2$/gram and 350 m$^2$/gram and a total pore volume in the range from about 0.25 cc/gram to about 0.50 cc/gram.

14. The catalyst defined in claim 12 having less than 0.06 cc/gram of the total pore volume in pores of diameter greater than 100 angstroms.

* * * * *